(12) United States Patent
Potter et al.

(10) Patent No.: US 7,456,594 B2
(45) Date of Patent: Nov. 25, 2008

(54) ELECTRIC MOTOR BRAKE ENGAGEMENT HOLDUP SYSTEM

(75) Inventors: Calvin C. Potter, Mesa, AZ (US); Paul T. Wingett, Mesa, AZ (US); Glenn H. Lane, Chandler, AZ (US)

(73) Assignee: Honeywell International Inc., Morristown, NJ (US)

( * ) Notice: Subject to any disclaimer, the term of this patent is extended or adjusted under 35 U.S.C. 154(b) by 184 days.

(21) Appl. No.: 11/450,479

(22) Filed: Jun. 9, 2006

(65) Prior Publication Data

US 2007/0285037 A1 Dec. 13, 2007

(51) Int. Cl.
*H02P 3/00* (2006.01)
*H02K 7/10* (2006.01)

(52) U.S. Cl. ...................... 318/377; 318/372

(58) Field of Classification Search .............. None
See application file for complete search history.

(56) References Cited

U.S. PATENT DOCUMENTS

| | | | |
|---|---|---|---|
| 4,417,288 A | 11/1983 | Hattori et al. | |
| 4,494,058 A | 1/1985 | Berti | |
| 4,850,250 A * | 7/1989 | Nehmer et al. | 477/9 |
| 5,070,290 A | 12/1991 | Iwasa et al. | |
| 5,327,055 A * | 7/1994 | Danielson et al. | 318/366 |
| 5,376,867 A | 12/1994 | Capetti | |
| 5,394,069 A * | 2/1995 | Danielson et al. | 318/371 |
| 5,574,345 A | 11/1996 | Yoneta et al. | |
| 5,814,955 A | 9/1998 | Bauer et al. | |
| 5,917,297 A | 6/1999 | Gerster et al. | |
| 6,094,024 A | 7/2000 | Westlake | |
| 6,373,210 B2 | 4/2002 | Roth-Stielow et al. | |
| 6,439,504 B1 | 8/2002 | Ahrendt | |
| 6,865,049 B1 | 3/2005 | Codilian et al. | |
| 6,930,458 B2 | 8/2005 | Akiyama et al. | |
| 6,979,965 B2 | 12/2005 | McMillan et al. | |
| 6,989,644 B2 | 1/2006 | Kim | |
| 7,005,817 B2 | 2/2006 | Thiesfeld et al. | |
| 2005/0110444 A1 | 5/2005 | Hassan et al. | |

FOREIGN PATENT DOCUMENTS

GB 2307118 5/1997

* cited by examiner

*Primary Examiner*—Renata McCloud
(74) *Attorney, Agent, or Firm*—Ingrassia, Fisher & Lorenz, P.C.

(57) ABSTRACT

An electric motor system includes a motor brake control circuit that uses current induced in the motor stator from generated back EMF to keep the motor brake energized and in its disengaged position, should electric power be lost to the motor system. When the motor has slowed sufficiently that the induced current is no longer sufficient to keep the motor brake energized, the motor brake will move to its engaged position, and prevent further motor rotation. The motor rotational speed at which the motor brake is no longer energized is sufficiently low that any potential degradation or other deleterious effects from motor brake engagement are minimized.

20 Claims, 2 Drawing Sheets

ELECTRIC MOTOR BRAKE ENGAGEMENT HOLDUP SYSTEM

TECHNICAL FIELD

The present invention relates to a motor brake system and, more particularly, to an electric motor brake system that includes an engagement holdup.

BACKGROUND

Actuators are used in myriad devices and systems. For example, many vehicles including, for example, aircraft, spacecraft, watercraft, and numerous other terrestrial and non-terrestrial vehicles, include one or more actuators to effect the movement of various control surfaces or components. In many applications such as, for example, aircraft flight surface control systems and aircraft thrust reverser actuation systems, the actuators include power drive units, such as motors, that are configured to receive a source of drive power to move an actuator element, and thus the control surfaces or components, to a commanded position. When the control surfaces or components reach the commanded position, the source of drive power may be removed. Thus, many of the actuators that are used include a motor brake, or what is sometimes referred to as a no-back device. The motor brake is configured to prevent motor rotation, and thus hold the actuator in position against the load once the actuator has moved the control surface or component to the commanded position.

The types and configurations of motor brakes that are included in actuators vary. In one particular configuration, the motor brake is configured to prevent motor rotation when it is de-energized, and to allow motor rotation when it is energized. With this configuration, the brake is typically energized during motor rotation, and is de-energized after the motor has driven the actuator to a commanded position and has stopped rotating. Although this configuration is generally safe, reliable, and robust, it may suffer certain drawbacks. For example, if electrical power becomes simultaneously unavailable to the motor and brake during motor operation, the brake will engage and impact the motor with an immediate load. Such an event can degrade or otherwise deleteriously effect the motor and/or the actuator and/or the overall actuation system.

Hence, there is a need for a motor brake system and circuit that addresses one or more of the above-noted drawbacks. Namely, a system and circuit that prevents or at least inhibits the motor brake from engaging, and impacting the motor with an immediate load, if electrical power becomes simultaneously unavailable to the motor and brake during motor operation.

BRIEF SUMMARY

In one embodiment, and by way of example only, an electric motor system includes a motor, a motor brake, and a brake control circuit. The motor has a stator and a rotor. The stator is configured to be energized from a power source and is operable, upon receipt thereof, to generate a rotating magnetic field that causes the rotor to rotate. The rotor is configured, upon rotation thereof, to generate a back EMF. The motor brake is disposed adjacent to the motor and is movable between an engaged position, in which the motor brake at least inhibits rotation of the rotor, and a disengaged position, in which the motor brake does not at least inhibit rotation of the rotor. The motor brake is configured to be selectively de-energized and energized and is operable, upon being de-energized and energized, to move to the engaged and disengaged positions, respectively. The brake control circuit is electrically coupled to the motor stator and is operable to selectively move the motor brake between the engaged and disengaged positions. The brake control circuit includes a brake control switch, a brake drive circuit, and a power loss switch. The brake control switch is configured to receive a switch control signal and is operable, upon receipt thereof, to transition from an open state, in which the motor brake is de-energized, to a closed state, in which the motor brake is energized. The brake drive circuit is operable to selectively supply the switch control signal to the brake control switch. The power loss switch is coupled to receive current induced in the motor stator from the generated back EMF and is configured to selectively supply the switch control signal to the brake control switch using the current induced in the motor stator. The power loss switch is further configured to selectively transition between an open state, in which the power loss switch does not supply the switch control signal, and a closed state, in which the power loss switch supplies the switch control signal.

In another exemplary embodiment, a motor brake system for an electric motor having at least a rotor and a stator includes a motor brake and a brake control circuit. The motor brake is movable between an engaged position, in which the motor brake is configured to at least inhibit rotation of the motor rotor, and a disengaged position, in which the motor brake is configured to not at least inhibit rotation of the motor rotor. The motor brake is additionally configured to be selectively de-energized and energized and operable, upon being de-energized and energized, to move to the engaged and disengaged positions, respectively. The brake control circuit is configured to selectively receive power from the motor stator and is operable to selectively move the motor brake between the engaged and disengaged positions. The brake control circuit includes a brake control switch, a brake drive circuit, and a power loss switch. The brake control switch is configured to receive a switch control signal and is operable, upon receipt thereof, to transition between an open state, in which the motor brake is de-energized, and a closed state, in which the motor brake is energized. The brake drive circuit is operable to selectively supply the switch control signal to the brake control switch. The power loss switch is coupled to receive the power from the motor stator and is configured to selectively supply the switch control signal to the brake control switch using the received power from the motor stator. The power loss switch is further configured to selectively transition between an open state, in which the power loss switch does not supply the switch control signal, and a closed state, in which the power loss switch supplies the switch control signal.

In yet another exemplary embodiment, a brake control circuit for selectively moving a motor brake element between an engaged position and a disengaged position includes a brake solenoid, a brake control switch, a brake drive circuit, and a power loss switch. The brake solenoid is configured to receive a flow of current and is operable, upon receipt thereof, to move the motor brake element to the engaged position. The brake control switch is configured to receive a switch control signal and is operable, upon receipt thereof, to transition from an open state, in which the flow of current to the brake solenoid is at least inhibited, to a closed state, in which the flow of current through the brake solenoid is allowed. The brake drive circuit is operable to selectively supply the switch control signal to the brake control switch. The power loss switch is coupled to receive the flow of current and is configured to selectively supply the switch control signal to the brake control switch using the received flow of current. The power loss switch is further configured to selectively transition between an open state, in which the power loss switch does not supply the switch control signal to the brake control switch, and a closed state, in which the power loss switch supplies the switch control signal.

Other independent features and advantages of the preferred electric motor system, motor brake system, and brake control circuit will become apparent from the following detailed description, taken in conjunction with the accompanying drawings which illustrate, by way of example, the principles of the invention.

DETAILED DESCRIPTION OF A PREFERRED EMBODIMENT

The following detailed description is merely exemplary in nature and is not intended to limit the invention or the application and uses of the invention. Furthermore, there is no intention to be bound by any theory presented in the preceding background or the following detailed description. In this regard, before proceeding with the detailed description, it is to be appreciated that the described embodiment is not limited to use in conjunction with a specific vehicle or system. Thus, although the description is explicitly directed toward an embodiment that is implemented in an aircraft flight surface control system or an aircraft thrust reverser actuation control system, it should be appreciated that it can be implemented in other vehicles and other actuation system designs, including those known now or hereafter in the art.

Figure 1:
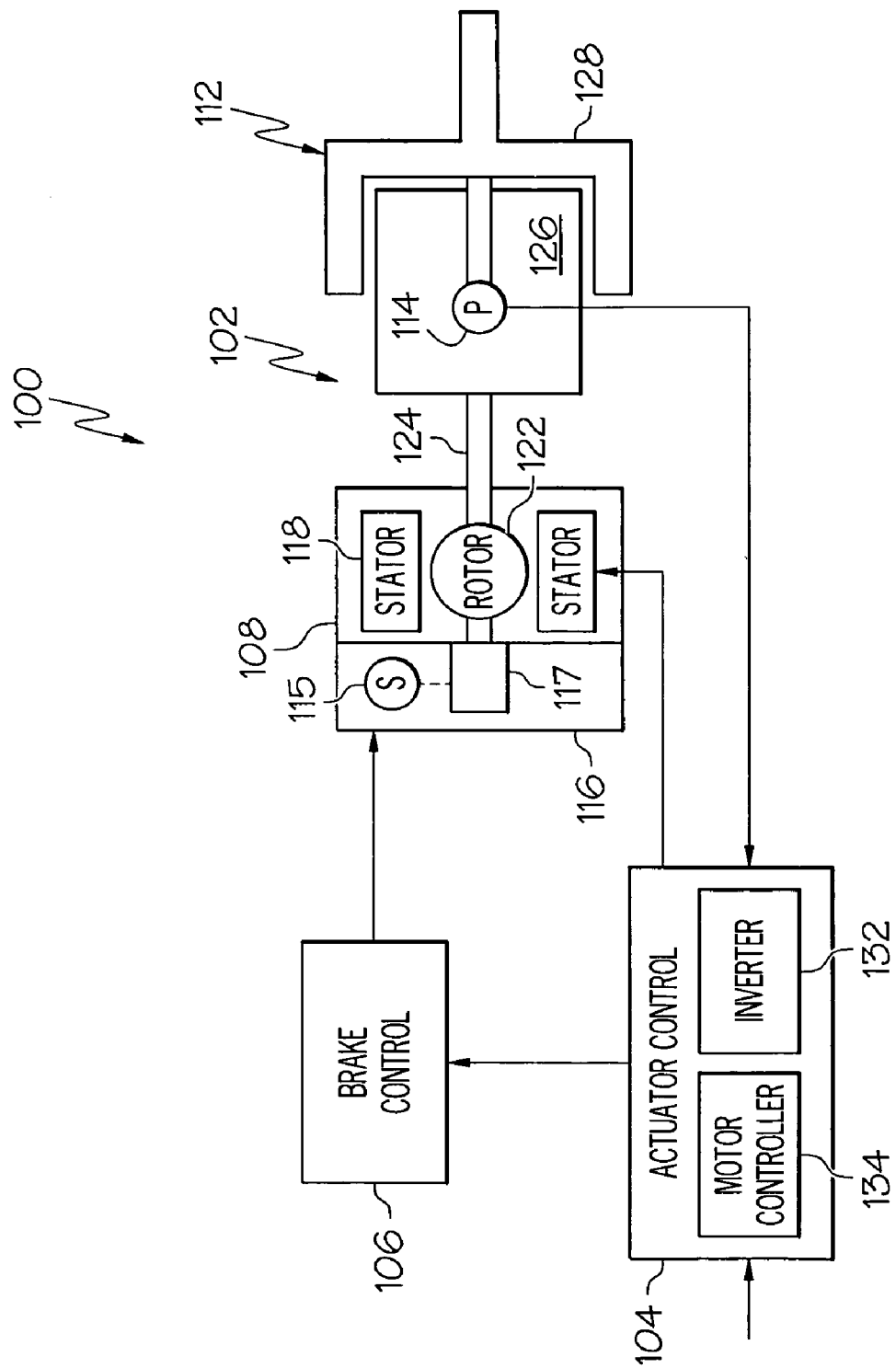
FIG. 1 is a functional block diagram of an exemplary actuator control system.

Turning now to FIG. 1, a functional block diagram of an exemplary actuator control system 100 is shown. The system 100, which may be used to control the movement of, for example, one or more flight control surfaces or one or more thrust reverser system components, includes an actuator assembly 102, an actuator control circuit 104, and a brake control circuit 106. The actuator assembly 102 includes a motor 108, an actuator 112, a position sensor 114, and a motor brake 116. The motor 108 includes a stator 118, a rotor 122, and an output shaft 124, and is preferably implemented as an electric motor. It will be appreciated that the motor 108 may be implemented using any one of numerous types of AC or DC electric motors now known or developed in the future including, for example, an AC induction motor or a brushed DC motor. In a preferred embodiment, however, the motor 108 is implemented as a brushless DC motor, and most preferably as a three-phase brushless DC motor. No matter how the motor 108 is specifically implemented, it is configured, upon being properly energized, to rotate and thereby supply a rotational drive force via the motor output shaft 124.

As FIG. 1 also shows, the motor output shaft 124 is coupled to the actuator 112. In the depicted embodiment, the actuator 112 includes an actuation member 126, which is coupled to receive the rotational drive force from the motor output shaft 124, and a translation member 128. In response to the rotational drive force supplied from the motor output shaft 124, the actuation member 126 rotates. The translation member 128 is coupled to the actuation member 126 and is configured, upon rotation thereof, to translate to a position. It will be appreciated that the actuation member 126 and translation member 128 could be implemented as any one of numerous assemblies that convert rotational motion into translational motion including, for example, ballscrew assemblies, jackscrew assemblies, and rollerscrew assemblies, just to name a few. It will additionally be appreciated that the actuator 112 could be implemented as any one of numerous other types of actuators including, but not limited to, numerous other types of linear actuators and/or numerous types of rotary actuators, just to name a few.

The position sensor 114, if included, is disposed within the actuator 112, and more specifically within the actuation member 126, and is additionally coupled to the translation member 128. Thus, when the translation member 128 translates in response to actuation member 126 rotation, the portion of the position sensor 114 that is coupled to the translation member 128 translates a commensurate distance. The position sensor 114 is configured to supply a position signal representative of translation member position. As FIG. 1 additionally depicts, the position signal is preferably supplied to the actuator control circuit 104.

The motor brake 116 is preferably disposed adjacent to the motor 108 and is preferably coupled to the motor output shaft 124. It will be appreciated, however, that the motor brake 116 could be coupled to any one of numerous other components to effect its function. In particular, the motor brake 116 is movable between an engaged position and a disengaged position. In the engaged position, the motor brake 116 at least inhibits, but preferably prevents, rotation of the motor output shaft 124, and thus the rotor 122. Conversely, in the disengaged position, the motor brake 116 allows (e.g., does not at least inhibit) rotor 122 rotation. In the depicted embodiment, the motor brake 116 is preferably implemented as an energize-to-disengage type brake, and includes a solenoid 115 and a brake element 117. The solenoid 115 and brake element 117 are configured such that the solenoid 115 moves the brake element 117 between the engaged and disengaged positions, upon being de-energized and energized, respectively. It will be appreciated that the brake element 117, in the engaged and disengaged positions, at least inhibits and does not at least inhibit, respectively, rotation of the rotor 122.

The actuator control circuit 104 selectively energizes the motor 108, and supplies a brake control signal to the brake control circuit 106. The actuator control circuit 104 is configured to receive external control signals from one or more external sources (not shown in FIG. 1). In response to these control signals, the actuator control circuit 104 appropriately energizes the motor 108 and supplies the brake control signal to the brake control circuit 106. More specifically, in the preferred embodiment, in which the motor 108 is implemented as a three-phase brushless DC motor, the actuator control circuit 104 appropriately energizes two of the three phases of the stator 118 to cause the rotor 122 rotate in a direction that will in turn cause the translation member 128 to move to a desired position. Thus, as FIG. 1 additionally depicts, the actuator control circuit 104 preferably includes at least an inverter 132 and an appropriate motor controller 134 to implement proper motor 108 commutation control. Moreover, while not illustrated in FIG. 1, one or more motor position sensors could be included, or the motor controller 134 could alternatively implement a sensorless commutation control scheme.

The brake control signal that the actuator control circuit 104 supplies to the brake control circuit 106 causes the brake control circuit 106 to either de-energize or energize the motor brake 116, to thereby move the motor brake 116 to either the engaged or disengaged position, respectively. In particular, the brake control signal causes the brake control circuit 106 to energize the motor brake 116, and thus move the motor brake 116 to the disengaged position when rotation of the motor 108 is to be allowed. Conversely, the brake control signal causes the brake control circuit 106 to de-energize the motor brake 116, and thus move the motor brake 116 to the engaged position when rotation of the motor 108 is to be prevented, or at least inhibited.

It may thus be appreciated that when the actuator control circuit 106 receive an external control signal to position the actuator 112, the actuator control circuit 104 supplies a brake control signal to the brake control circuit 106 that causes the brake control circuit 106 to move the motor brake 116 to the disengaged position. The actuator control circuit 104 additionally energizes the motor 108 to rotate in the appropriate direction. Using the actuator position signals supplied from the actuator position sensor 114 as feedback, the actuator control circuit 104 implements a closed-loop control loop to move the actuator 112 to a commanded position. When the actuator 112 attains the commanded position, the actuator control circuit 104 no longer energizes the motor 108, and the brake control signal it supplies to the brake control circuit 106 causes the brake control circuit 106 to move the motor brake 116 to the engaged position. It will be appreciated that the actuator control circuit 104 may be configured to implement any one of numerous control schemes. For example, the actuator control circuit 104 may be a flight surface control circuit that is configured to implement one or more aircraft flight surface position control schemes, or an aircraft thrust reverser actuation control circuit that is configured to implement one or more thrust reverser actuation position control schemes, just to name a few.

Figure 2:
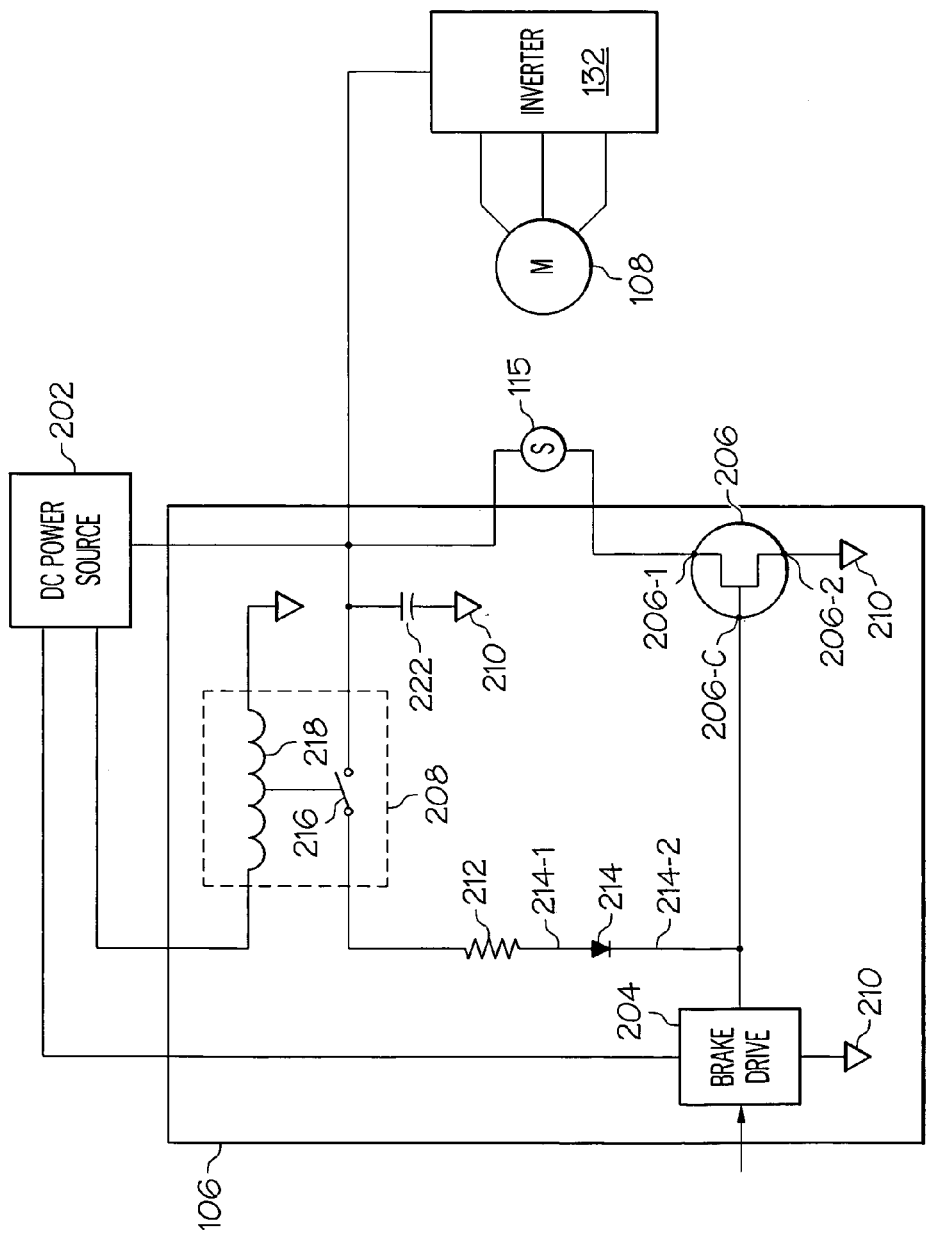
FIG. 2 is a functional block diagram of an exemplary brake control circuit that may be used in the actuator control system of FIG. 1.

The brake control circuit 106, as was noted above, is configured to selectively move the motor brake 116 between its engaged and disengaged positions. As was also noted above, the brake control circuit 106, in order to move the motor brake 116 to its disengaged and engaged positions, energizes and de-energizes the motor brake 116, respectively. It may thus be appreciated that in the unlikely event that power is lost or is otherwise unavailable to the brake control circuit 106 when it is energizing the motor brake 116, the motor brake 116 will move to the engaged position. However, the brake control circuit 106 is configured such that, if its normal source of electrical power is lost or otherwise unavailable, it will not instantaneously de-energize the motor brake 116, thereby preventing a high-speed motor/brake engagement event. A particular preferred embodiment of the brake control circuit 106 is depicted in FIG. 2, and with reference thereto, will now be described.

The brake control circuit 106 is powered from a DC power source 202, and includes a brake drive circuit 204, a brake control switch 206, and a power loss switch 208. The DC power source 202, which is preferably implemented as a multiple voltage magnitude DC power source, supplies DC power to the brake control circuit 106, and to the motor stator 118 via the inverter 132. Thus, as is clearly depicted in FIG. 2, the brake control circuit 106 is electrically coupled to the motor stator 118 and, in the event the DC power source 202 becomes unavailable, neither the motor 108 nor the brake control circuit 106 will receive power from the DC power source 202.

The brake drive circuit 204 is preferably powered from the DC power source 202, and is configured to selectively supply a switch control signal to the brake control switch 206. More specifically, the brake drive circuit 204 is responsive to the brake control signal supplied from the actuator control circuit 104 to selectively supply the switch control signal to the brake control switch 206. The brake drive circuit 204 may be implemented using any one of numerous known circuits that are configured to be responsive to an input signal to supply a suitable switch control signal. It will be appreciated that the particular circuit that is used to implement the brake drive circuit 206 may vary depending, for example, on the specific implementation of the brake control switch 206.

The brake control switch 206 is electrically coupled in series between the motor brake 116, and more specifically the brake solenoid 115, and a common node 210. The motor brake 116 is in turn electrically coupled to the DC power source 202. The brake control switch 206 is additionally coupled to the brake drive circuit 204 to receive the switch control signal selectively supplied therefrom. The brake control switch 206, in response to the switch control signal, is configured to transition from an open state to a closed state. When the brake control switch 206 is in the open state, the motor brake 116 is de-energized and is thus moved to the engaged position. Conversely, when the brake control switch 206 is in the closed state, the motor brake 116 is energized and is thus moved to the disengaged position. As will be described further below, the motor brake 116 may be energized with power supplied from either the DC power source 202 or from the back EMF generated in the motor 108.

It will be appreciated that the brake control switch 206 could be implemented using anyone of numerous types of switch devices to implement its functionality. In the depicted embodiment, however, the brake control switch 204 is implemented as a solid state device, and more specifically as a metal oxide semiconductor (MOS) transistor, that includes a first terminal 206-1, a second terminal 206-2, and a control terminal 206-C. As depicted, the first terminal 206-1 is coupled to the motor brake 116, the second terminal 206-2 is coupled to the common node 210, and the control terminal 206-C is coupled to, and receives the switch control signal from, the brake drive circuit 204. The control terminal 206-C, as is generally known, is the gate terminal. The first and second terminals 206-1, 206-2 could be either the source terminal and drain terminal, respectively, or vice-versa, depending upon whether the brake control switch 206 is implemented as a PMOS or NMOS device. It is further noted that although the brake control switch 206 is depicted as being implemented using a field effect transistor (FET), and more specifically a MOSFET, it could alternatively be implemented using a bipolar transistor (either NPN or PNP type) as well.

The power loss switch 208 is electrically coupled in series between the DC power source 202 and the brake control switch 206. More specifically, and at least in the depicted embodiment, the power loss switch 208 is electrically coupled in series between the DC power source 202 and the brake control switch control terminal 206-C, via a series-coupled resistor 212 and diode 214. The resistor 212 is electrically coupled in series between the power loss switch 208 and the diode 214. It will be appreciated that although the resistor 212 is depicted as being implemented using a single, conventional resistor element, it could be implemented using multiple conventional resistor elements, or one or more other types of circuit elements that exhibit a desired amount of resistance to the flow of DC current. The diode 214 is in turn electrically coupled in series between the resistor 212 and the brake control switch control terminal 206-C, with the diode anode terminal 214-1 electrically coupled to the resistor 212 and the diode cathode terminal 214-2 electrically coupled to the brake control switch control terminal 206-C.

The power loss switch 208 is configured to selectively transition between an open state and a closed state. The power loss switch 208 is configured to move to the open state whenever the DC power source 202 is operating to supply DC power, and to move to the closed state whenever the DC power source 202 is not supplying DC power. As may be evident from FIG. 2, when the power loss switch 208 is in the open state, no current flows through the power loss switch 208. Conversely, when it is in the closed state, current may flow through the power loss switch 208, and through the resistor 212 and diode 214. In the closed state, the power loss switch 208 may thus supply the switch control signal to the brake control switch 206. As will be described further below, the source of current through the power loss switch 208 when it is closed is current that is induced in the motor stator 118 from back EMF that is generated in the motor 108.

It will be appreciated that, similar to the brake control switch 206, the power loss switch 208 may be implemented using any one of numerous types of switches, including any one of numerous types of solid state switch devices. In the depicted embodiment, however, the power loss switch is implemented using a relay, which includes a relay contact 216 and a relay coil 218. The relay contact 216 is electrically coupled in series between the DC power source 202 and the brake control switch 206 (via the resistor 212 and diode 214), and is configured to selectively move between the open state and the closed state. The relay coil 218 is electrically coupled between the DC power source 202 and the common node 210. Thus, whenever the DC power source 202 is operating to supply DC power, current flows through the relay coil 218, and the relay contact 216 is moved to its open state. Conversely, whenever the DC power source 202 is not supplying DC power, the relay coil 218 will be de-energized, and the relay contact 216 moves to its closed state.

The brake control circuit 106, as was previously noted, is configured to prevent a high-speed motor/brake engagement event, if the DC power source 202 is lost or otherwise becomes unavailable while the motor brake 116 is in the disengaged position. Having described a particular preferred implementation of the brake control circuit 106 for carrying out this functionality, a more detailed description of the operation of the brake control circuit 106 will now be provided. In doing so, reference should be made to FIGS. 1 and 2, as needed, either individually or in combination. Before proceeding, however, it is noted that the brake control circuit 106 additionally includes a capacitance circuit element 222 that is electrically coupled in parallel with the motor brake solenoid 115 and the brake control switch 206. The purpose of the capacitance circuit element 222 will become apparent from the following description.

During normal actuator control system 100 operation, the DC power source 202 is operating properly and supplying DC power to at least the inverter 132, the brake drive circuit 204, and the power loss switch relay coil 218. Thus, the power loss switch 208 is in its open position. The actuator control circuit 104, upon receipt of an external control signal to position the actuator 112, supplies a brake control signal to the brake control circuit 106 that causes the brake control circuit 106 to move the motor brake 116 to the disengaged position, and energizes the motor 108 to rotate in the appropriate direction. More specifically, the brake control signal is supplied to the brake drive circuit 204, which in turn supplies the switch control signal to the brake control switch 206. The brake control switch 206, in response to the brake control signal, transitions from its open state to its closed state, allowing the motor brake solenoid 115 to be energized from the DC power source 202. The energized solenoid 115 moves the brake element 117 to the disengaged position. The actuator control circuit 104, using known brushless DC motor control techniques, controls the inverter 132 to selectively supply power from the DC power source 202 to the motor stator 118 to cause the motor rotor 122 to rotate.

If, during motor 108 operation the DC power source 202 is lost or otherwise becomes unavailable to supply sufficient DC power, the power used to energize the motor 108 will be lost, and it will begin to coast to a stop. Additionally, the brake drive circuit 204 and power loss switch relay coil 218 will be de-energized. When this occurs, the brake drive circuit 204 will no longer supply the switch control signal to the brake control switch 206 and, because the power loss switch relay coil 218 is de-energized, the power loss switch 208 transitions to its closed position. In the closed position, current induced in the motor stator 118 from the back EMF that is generated in the motor 108 flows through the power loss switch 208, the resistor 212, and diode 214, and supplies the switch control signal to the brake control switch 206, keeping it in its closed state. The induced current also keeps the motor brake solenoid 115 energized, thereby keeping the brake element 117 in its disengaged position. The capacitance circuit element 122 that was mentioned above, maintains a sufficient charge to keep the motor brake solenoid 115 energized while the power loss switch 208 transitions from its open state to its closed state. When the motor 108 has slowed sufficiently that the induced current is no longer sufficient to keep the brake element solenoid 115 energized, the motor brake 116 will move to its engaged position, and prevent further motor rotation. It will be appreciated, however, that the motor rotational speed is sufficiently low that the potential degradation or other deleterious effects from motor brake 116 engagement are minimized.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. An electric motor system, comprising:
   a motor having a stator and a rotor, the stator configured to be energized from a power source and operable, upon receipt thereof, to generate a rotating magnetic field that causes the rotor to rotate, the rotor configured, upon rotation thereof, to generate a back EMF;
   a motor brake disposed adjacent to the motor and movable between an engaged position, in which the motor brake at least inhibits rotation of the rotor, and a disengaged position, in which the motor brake does not at least inhibit rotation of the rotor, the motor brake configured to be selectively de-energized and energized and operable, upon being de-energized and energized, to move to the engaged and disengaged positions, respectively; and
   a brake control circuit electrically coupled to the motor stator and operable to selectively move the motor brake between the engaged and disengaged positions, the brake control circuit including:
      a brake control switch configured to receive a switch control signal and operable, upon receipt thereof, to transition from an open state, in which the motor brake is de-energized, to a closed state, in which the motor brake is energized, a brake drive circuit operable to selectively supply the switch control signal to the brake control switch, and a power loss switch coupled to receive current induced in the motor stator from the generated back EMF and configured to selectively supply the switch control signal to the brake control switch using the current induced in the motor stator, the power loss switch further configured to selectively transition between an open state, in which the power loss switch does not supply the switch control signal, and a closed state, in which the power loss switch supplies the switch control signal.

2. The system of claim 1, wherein:
the motor brake includes a solenoid and a brake element;
the brake element is movable between the engaged and disengaged positions;
the solenoid is configured to receive a flow of current and is operable, upon receipt thereof, to move the brake element to the engaged position; and
the solenoid receives the flow of current when the brake control switch is in the closed state.

3. The system of claim 2, wherein:
the brake control switch comprises a transistor having at least a first terminal, a second terminal, and a control terminal;
the first terminal is electrically coupled in series with the solenoid;
the second terminal is electrically coupled to a common node; and
the control terminal is coupled to receive the switch control signal.

4. The system of claim 3, wherein the transistor is an MOS transistor.

5. The system of claim 3, further comprising:
a current limiting resistor coupled in series between the transistor second terminal and the common node.

6. The system of claim 1, wherein the power loss switch comprises a relay including:
a relay contact electrically coupled in series between the motor stator and the brake control switch, and configured to selectively move between the open state and the closed state; and
a relay coil coupled to selectively receive current from a power source and operable, upon receipt of the current, to move the relay contact to the open state.

7. The system of claim 6, further comprising:
a diode electrically coupled in series between the relay contact and the brake control switch, the diode having an anode terminal and a cathode terminal, the diode cathode terminal electrically coupled to the brake control switch.

8. The system of claim 7, further comprising:
a resistor electrically coupled in series between the relay contact and the diode anode terminal.

9. The system of claim 3, further comprising:
a capacitor electrically coupled in parallel with the solenoid and the brake control switch.

10. A motor brake system for an electric motor that includes at least a rotor and a stator, the system comprising:
a motor brake movable between an engaged position, in which the motor brake is configured to at least inhibit rotation of the motor rotor, and a disengaged position, in which the motor brake is configured to not at least inhibit rotation of the motor rotor, the motor brake configured to be selectively de-energized and energized and operable, upon being de-energized and energized, to move to the engaged and disengaged positions, respectively; and a brake control circuit configured to selectively receive power from the motor stator and operable to selectively move the motor brake between the engaged and disengaged positions, the brake control circuit including:
a brake control switch configured to receive a switch control signal and operable, upon receipt thereof, to transition between an open state, in which the motor brake is de-energized, and a closed state, in which the motor brake is energized,
a brake drive circuit operable to selectively supply the switch control signal to the brake control switch, and
a power loss switch coupled to receive the power from the motor stator and configured to selectively supply the switch control signal to the brake control switch using the received power from the motor stator, the power loss switch further configured to selectively transition between an open state, in which the power loss switch does not supply the switch control signal, and a closed state, in which the power loss switch supplies the switch control signal.

11. The system of claim 10, wherein:
the motor brake includes a solenoid and a brake element;
the brake element is movable between the engaged and disengaged positions;
the solenoid is configured to receive a flow of current and is operable, upon receipt thereof, to move the brake element to the engaged position; and
the solenoid receives the flow of current when the brake control switch is in the closed state.

12. The system of claim 11, wherein:
the brake control switch comprises a transistor having at least a first terminal, a second terminal, and a control terminal;
the first terminal is electrically coupled in series with the solenoid;
the second terminal is electrically coupled to a common node; and
the control terminal is coupled to receive the switch control signal.

13. The system of claim 12, further comprising:
a current limiting resistor coupled in series between the transistor second terminal and the common node; and
a capacitor electrically coupled in parallel with the solenoid and the brake control switch.

14. The system of claim 10, wherein the power loss switch comprises a relay including:
a relay contact coupled to the brake control switch and configured to receive the power from the motor stator and to selectively move between the open state and the closed state; and
a relay coil coupled to selectively receive current from a power source and operable, upon receipt of the current, to move the relay contact to the open state.

15. The system of claim 14, further comprising:
a diode electrically coupled in series between the relay contact and the brake control switch, the diode having an anode terminal and a cathode terminal, the diode cathode terminal electrically coupled to the brake control switch; and
a resistor electrically coupled in series between the relay contact and the diode anode terminal.

16. A brake control circuit for selectively moving a motor brake element between an engaged position and a disengaged position, the brake control circuit comprising:
a brake solenoid configured to receive a flow of current and operable, upon receipt thereof, to move the motor brake element to the engaged position;

a brake control switch configured to receive a switch control signal and operable, upon receipt thereof, to transition from an open state, in which the flow of current to the brake solenoid is at least inhibited, to a closed state, in which the flow of current through the brake solenoid is allowed;

a brake drive circuit operable to selectively supply the switch control signal to the brake control switch; and a power loss switch coupled to receive the flow of current and configured to selectively supply the switch control signal to the brake control switch using the received flow of current, the power loss switch further configured to selectively transition between an open state, in which the power loss switch does not supply the switch control signal to the brake control switch, and a closed state, in which the power loss switch supplies the switch control signal.

17. The circuit of claim 16, wherein:

the brake control switch comprises a transistor having at least a first terminal, a second terminal, and a control terminal;

the first terminal is electrically coupled in series with the brake solenoid;

the second terminal is electrically coupled to a common node; and the control terminal is coupled to receive the switch control signal.

18. The circuit of claim 17, further comprising:

a current limiting resistor coupled in series between the transistor second terminal and the common node; and a capacitor electrically coupled in parallel with the brake solenoid and the brake control switch.

19. The circuit of claim 16, wherein the power loss switch comprises a relay including:

a relay contact electrically coupled to the brake control switch and configured to selectively receive power from a motor stator and to selectively move between the open state and the closed state; and a relay coil coupled to selectively receive current from a power source and operable, upon receipt of the current, to move the relay-contact to the open state.

20. The circuit of claim 19, further comprising:

a diode electrically coupled in series between the relay contact and the brake control switch, the diode having an anode terminal and a cathode terminal, the diode cathode terminal electrically coupled to the brake control switch; and a resistor electrically coupled in series between the relay contact and the diode anode terminal.

* * * * *